United States Patent
Yang et al.

(10) Patent No.: US 12,326,205 B2
(45) Date of Patent: Jun. 10, 2025

(54) PIPELINE, PIPELINE CONNECTOR, AND LIQUID CHROMATOGRAPHY SYSTEM

(71) Applicant: Maxi Scientific Instruments (Suzhou) Co., Ltd., Suzhou (CN)

(72) Inventors: Pan Yang, Suzhou (CN); Jianjun Deng, Suzhou (CN); Xuefeng Luo, Suzhou (CN)

(73) Assignee: MAXI SCIENTIFIC INSTRUMENTS (SUZHOU) CO. LTD, Suzhou (CN)

( * ) Notice: Subject to any disclaimer, the term of this patent is extended or adjusted under 35 U.S.C. 154(b) by 0 days.

(21) Appl. No.: 18/525,727

(22) Filed: Nov. 30, 2023

(65) Prior Publication Data

US 2024/0110650 A1  Apr. 4, 2024

Related U.S. Application Data

(63) Continuation-in-part of application No. PCT/CN2022/107116, filed on Jul. 21, 2022.

(30) Foreign Application Priority Data

Jul. 28, 2021 (CN) .......................... 202110859930.2

(51) Int. Cl.
  *F16L 19/06* (2006.01)
  *G01N 30/02* (2006.01)

(52) U.S. Cl.
  CPC ............ *F16L 19/061* (2013.01); *G01N 30/02* (2013.01)

(58) Field of Classification Search
  CPC ......... F16L 17/00; F16L 17/06; F16L 17/067; F16L 17/08; F16L 21/007; F16L 21/035; F16L 21/02; F16L 21/04; F16L 19/06; F16L 19/061; F16L 19/065; F16L 19/0656
  See application file for complete search history.

(56) References Cited

U.S. PATENT DOCUMENTS

2015/0300542 A1* 10/2015 Graham .............. F16L 19/0206
  285/393
2021/0190243 A1* 6/2021 Norman ............. G01N 30/6026

* cited by examiner

*Primary Examiner* — Aaron M Dunwoody
(74) *Attorney, Agent, or Firm* — MATTHIAS SCHOLL P.C.; Matthias Scholl

(57) ABSTRACT

A pipeline includes a pipeline body, a sealing member, and a sleeve. The pipeline body includes a connection end; the connection end includes a first section and a second section adjacent to the first section; and the first section includes an end face perpendicular to the axis of the pipeline body. The sealing member includes a first annular part and a second annular part; the first annular part and the second annular part are disposed coaxially; the second annular part includes a first surface oriented toward the first annular part; an axial projection of the first annular part falls within the first surface; the first surface includes a first region and a second region; the first region is enclosed by the axial projection of the first annular part, and the second region surrounds the axial projection of the first annular part.

17 Claims, 11 Drawing Sheets

PIPELINE, PIPELINE CONNECTOR, AND LIQUID CHROMATOGRAPHY SYSTEM

CROSS-REFERENCE TO RELATED APPLICATIONS

This application is a continuation-in-part of International Patent Application No. PCT/CN2022/107116 with an international filing date of Jul. 21, 2022, designating the United States, now pending, further claims foreign priority benefits to Chinese Patent Application No. 202110859930.2 filed Jul. 28, 2021. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, MA 02142.

BACKGROUND

The disclosure relates to the technical field of components used in fluid connection systems, and more particularly, to a pipeline, a pipeline connector, and a liquid chromatography system.

Liquid chromatography is a widely used method to separate and analyze components of a sample. The method involves the passage of the sample, usually dissolved in a liquid solvent, through a liquid chromatography system. The liquid chromatography system separates the components using solid-phase interactions, enabling the subsequent detection of the components. A conventional liquid chromatography system includes filters, check valves, guard columns, chromatographic columns, and an interconnected network of pipelines. To ensure effective separation, most liquid chromatography systems operate under high pressure, requiring strict design standards for pipelines and connections to achieve secure and reliable seals.

The conventional connection system utilizes metal seals fastened by screws. The metal seals are inserted into conical sockets located between the connected pipelines and socket units of a target component. The process introduces inherent dead volume due to gaps between the connected pipelines and the socket units. Varying specifications of the socket units among different target components can make a single pipeline connector incompatible, leading to increased dead volume and connection challenges.

Current pipeline designs primarily focus on sealing performance and dead volume, and the pipeline connectors require regular installation of sealing elements. With extended use and frequent assembly/disassembly, the seals tend to wear, resulting in thinner sidewalls and enlarged inner cavities. The process affects the sealing performance and leads to issues like structural damage and detachment, reducing the overall lifespan and effectiveness of the sealing elements.

SUMMARY

To solve the aforesaid problems, the first objective of the disclosure is to provide a pipeline. The pipeline comprises a pipeline body, a sealing member and a sleeve. The pipeline body comprises a connection end. The connection end comprises a first section and a second section adjacent to the first section. The first section comprises an end face perpendicular to an axis of the pipeline. The sealing member comprises a first annular part and a second annular part. The first annular part and the second annular part are disposed coaxially. The second annular part comprises a first surface oriented toward the first annular part. An axial projection of the first annular part falls within the first surface. The first surface comprises a first region and a second region. The first region is enclosed by the axial projection of the first annular part, and the second region surrounds the axial projection of the first annular part. The first annular part sleeves the outer wall of the first section. The end face of the first section abuts against the first region. The sleeve sleeves the second section and the first annular part. The sleeve comprises an end face abutting against the second region.

The second objective of the disclosure is to provide a pipeline connector. The pipeline connector comprises a screw. The screw comprises a first through hole. The first through hole comprises a first hole part and a second hole part disposed adjacent to the first hole part. The first hole part has a greater diameter than the second hole part. A junction of the first hole part and the second hole part forms a first step structure.

The third objective of the disclosure is to provide a liquid chromatography system. The liquid chromatography system comprises the pipeline, the pipeline connector, and a target component. The target component comprises a liquid channel entrance comprising internal threads. The screw sleeves the outer wall of the pipeline; the sleeve comprises a distal end away from the sealing member; the distal end of the sleeve abuts against the first step structure; and the screw is threaded into the internal threads of the liquid channel entrance.

The following advantages are associated with the disclosure. The first annular part and the second annular part are disposed coaxially; the first annular part provides radial sealing on the side of the connection end; the second annular part offers axial sealing on the end face of the connection end. The dual-sealing design improves the durability of the pipeline. Conventional pipelines relying solely on axial sealing at the end face often experience wear on the front surface of the sealing member over time. Similarly, pipelines relying only on radial sealing may experience wear on the side of the sealing member, particularly during repeated assembly and disassembly. Therefore, by combining both sealing methods, the pipeline can extend its lifespan significantly compared to the pipelines with only one sealing method under similar conditions.

DETAILED DESCRIPTION

To further illustrate the disclosure, embodiments detailing the pipeline, the pipeline connector, and the liquid chromatography system are described below. It should be noted that the following embodiments are intended to describe and not to limit the disclosure.

Example 1

Figure 1:
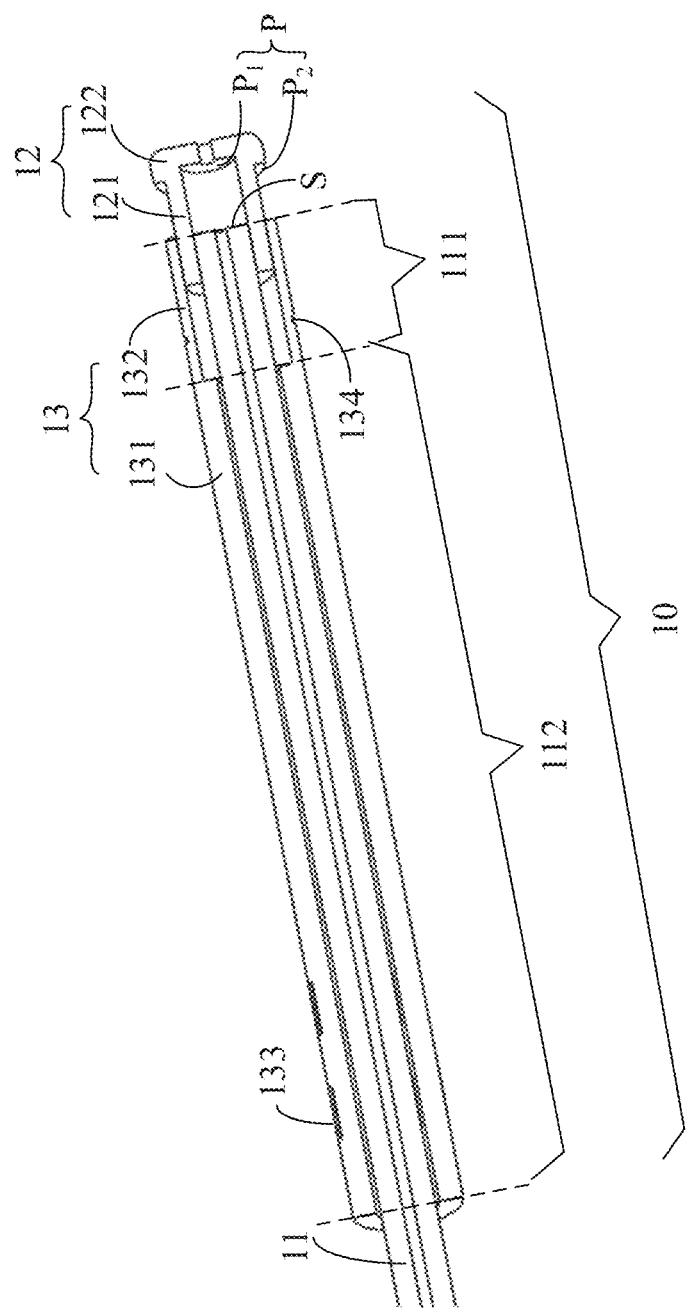
FIG. 1 is a cross sectional view illustrating the disassembly of a pipeline according to Example 1 of the disclosure.
Figure 2:
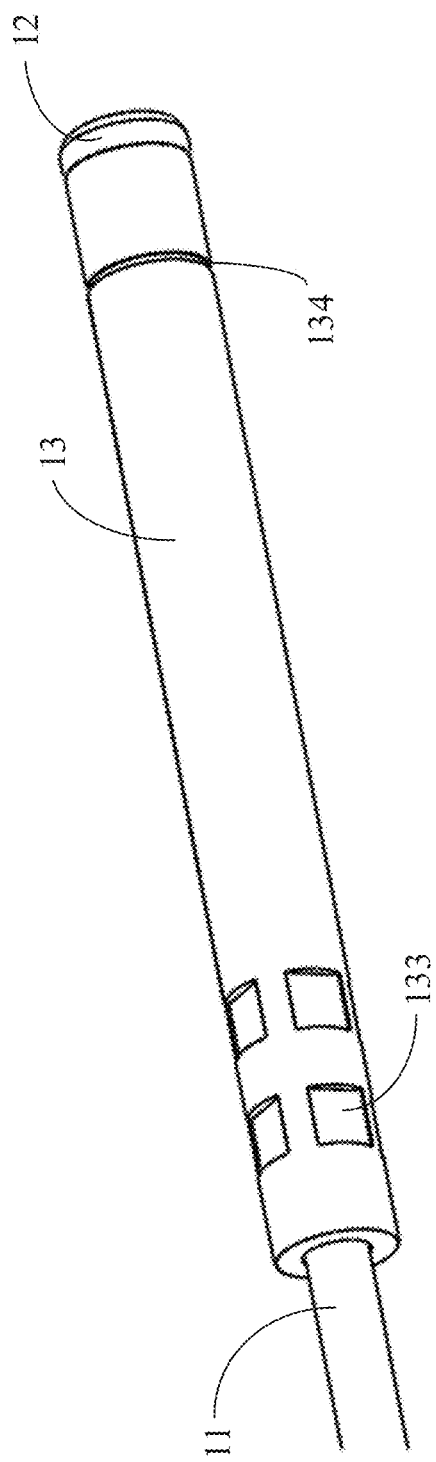
FIG. 2 is a perspective view illustrating the assembly of a pipeline in FIG. 1.

FIG. 1 is a cross sectional view illustrating the disassembly of a pipeline according to Example 1 of the disclosure. FIG. 2 is a perspective view illustrating the assembly of a pipeline in FIG. 1. As show in FIGS. 1 and 2, a pipeline 10 comprises a pipeline body 11, a sealing member 12, and a sleeve 13.

The pipeline body 11 is used to transport liquids. The pipeline body 11 comprises a capillary tube. The capillary tube comprises corrosion-resistant, high-strength metal materials, such as stainless steel and alloys. The pipeline body 11 is in the shape of a circular or square tube. The pipeline body 11 comprises a connection end. The connection end comprises a first section 111 and a second section 112 adjacent to the first section 111. The first section 111 comprises an end face S perpendicular to an axis of the pipeline body 11.

The sealing member 12 comprises a corrosion-resistant plastic, such as polyether ether ketone (PEEK), polytetrafluoroethylene (PTFE), and polypropylene. The sealing member 12 comprises a first annular part 121 and a second annular part 122. The first annular part 121 and the second annular part 122 are coaxially disposed. The first annular part 121 has a greater axial length than the second annular part 122. The first annular part 121 functions as a sealing sleeve, and the second annular part 122 functions as a sealing gasket. The second annular part 122 is disposed on the top part of the first annular part 121. The second annular part 122 comprises a first surface P oriented toward the first annular part 121. An axial projection of the first annular part 121 falls within the first surface P. The first surface P comprises a first region P1 and a second region P2. The first region P1 is enclosed by the axial projection of the first annular part 121, and the second region P2 surrounds the axial projection of the first annular part 121. The first annular part 121 comprises a first bore, the second annular part 122 comprises a second bore, and the pipeline body 11 comprises a third bore. The first annular part 121 sleeves the outer wall of the first section 111, and the end face S abuts against the first region P1, thus achieving a sealed connection between the third bore and the second bore. The second annular part 122 has a larger inner diameter than the pipeline body 11. In certain embodiments, the inner diameter of the second annular part 122 is 1.05 to 1.65 times that of the inner diameter of the pipeline body 11. For example, the inner diameter of the second annular part 122 is 1.2 times, 1.3 times, or 1.4 times that of the inner diameter of the pipeline body 11. The design prevents the obstruction of a liquid passage during the connection of the pipeline 10 to a target component by preventing compression-induced deformation of the second annular part 122 and a reduction in the inner diameter of the second annular part 122. An excessive fit is formed between the first annular part 121 and the first section 111, thus simplifying the assembly and securement of the pipeline body 11 and the sealing member 12. The first bore shares the same shape as the third bore. For example, when the pipeline body 11 is in the shape of a circular tube, the first bore is cylindrical. The outer wall of the first annular part 121 is configured as required, which comprises cylindrical and conical shapes. The second bore matches the shape of the third bore. For example, both the second bore and the third bore are cylindrical. The sleeve 13 comprises a corrosion-resistant, high-strength metal material, such as stainless steel and alloys. In certain embodiments, the sleeve 13 comprises the same material as the pipeline body 11; the sleeve 13 sleeves the second section 112 and the first annular part 121; and the sleeve 13 comprises an end face abutting against the second region P2. Specifically, the sleeve 13 comprises a first sleeve part 131 and a second sleeve part 132; the first sleeve part 131 sleeves the outer wall of the second section 112; and the second sleeve part 132 sleeves the outer wall of the first annular part 121. The first sleeve part 131 and the second sleeve part 132 are fitted to the second section 112 and the first annular part 121, respectively, by a snug fit, a sliding fit, or a clearance fit, thereby simplifying the assembly of the sleeve 13, the pipeline body 11, and the sealing member 12. In certain embodiments, the inner wall of the first sleeve part 131 matches the shape of the outer wall of the second section 112; for example, the outer wall of the second section 112 has the same cylindrical shape as the inner wall of the first sleeve part 131. In certain embodiments, the inner wall of the second sleeve part 132 matches the shape of the outer wall of the first annular part 121; for example, the outer wall of the first annular part 121 has the same cylindrical shape as the inner wall of the second sleeve part 132. The outer wall of the sleeve 13 is cylindrical in the shape.

In certain embodiments, the inner diameter of the second annular part 122 ranges from 80% to 120% of the outer diameter of the pipeline body 11. The pipeline body 11 is inserted through the second annular part 122, so that the end face S is level with or below the end face of the second annular part 122. The design ensures reliable sealing and prevents excessive radial deformation of the second annular part 122, thus avoiding potential blockage of the second bore.

In certain embodiments, the pipeline 10 further comprises a circular disc disposed on the end face S. The circular disc comprises metal material and is welded to the pipeline body 11. The circular disc has a greater outer diameter than the pipeline body 111 but a smaller outer diameter than the second annular part 122. The circular disc further fits against the end face of the second annular part 122. During compression in use, the sealing member 12 is protected against abrasion on the end face S, and only a portion of the second annular part 122 undergoes axial deformation, enhancing the durability of the sealing member 12 and extending its lifespan.

The sleeve 13 further comprises a first tightening section 133 disposed on the first sleeve part 131. The first tightening section 133 is used to apply pressure to the second section 112 to secure the sleeve 13 to the pipeline body 11. In certain embodiments, the first tightening section 133 is formed through a riveting process; specifically, a designated region of the sleeve 13 is riveted to form a groove that serves as the first tightening section 133. Riveting is a cost-effective and readily applicable method in an industrial environment. The sleeve 13 further comprises a second tightening section 134 disposed on the second sleeve part 132. The second tightening section 134 is used to apply pressure to the first annular part 121 to secure the sleeve 13 to the sealing member 12. In certain embodiments, the second tightening section 134 is formed through shrinkage or riveting. The first tightening section 133 and the second tightening section 134 are respectively disposed at both ends of the sleeve 13 to enhance the reliability of the securing strength; furthermore, using the two tightening sections 133 and 134, rather than just one, evenly distributes securing pressure and prevents potential deformation of the pipeline body 11 or cracking of the sleeve 13 due to excessive pressure from a single tightening section.

When the pipeline 10 is connected to the target component, an axial force is exerted upon the sleeve 13, yielding several advantages. Firstly, the second annular part 122 undergoes axial deformation and compresses the end face S, thereby forming an axial seal. Simultaneously, the first annular part 121 undergoes radial deformation and exerts pressure against the outer wall of the pipeline body 11, thus forming a radial seal. Consequently, the pipeline 10 offers both axial and radial seals to satisfy the demands of high-pressure sealing. Additionally, using only axial sealing at the end face S leads to wear on the end face of the sealing member 12 over time, and relying only radial sealing on the outer wall of the pipeline body 11 results in wear on the lateral surface of the sealing member 12 during frequent assembly and disassembly. Therefore, when the pipeline 10 combines both the axial and radial sealing under the same conditions, the lifespan increases by over two times compared to pipelines using only one sealing method.

Example 2

Figure 3:
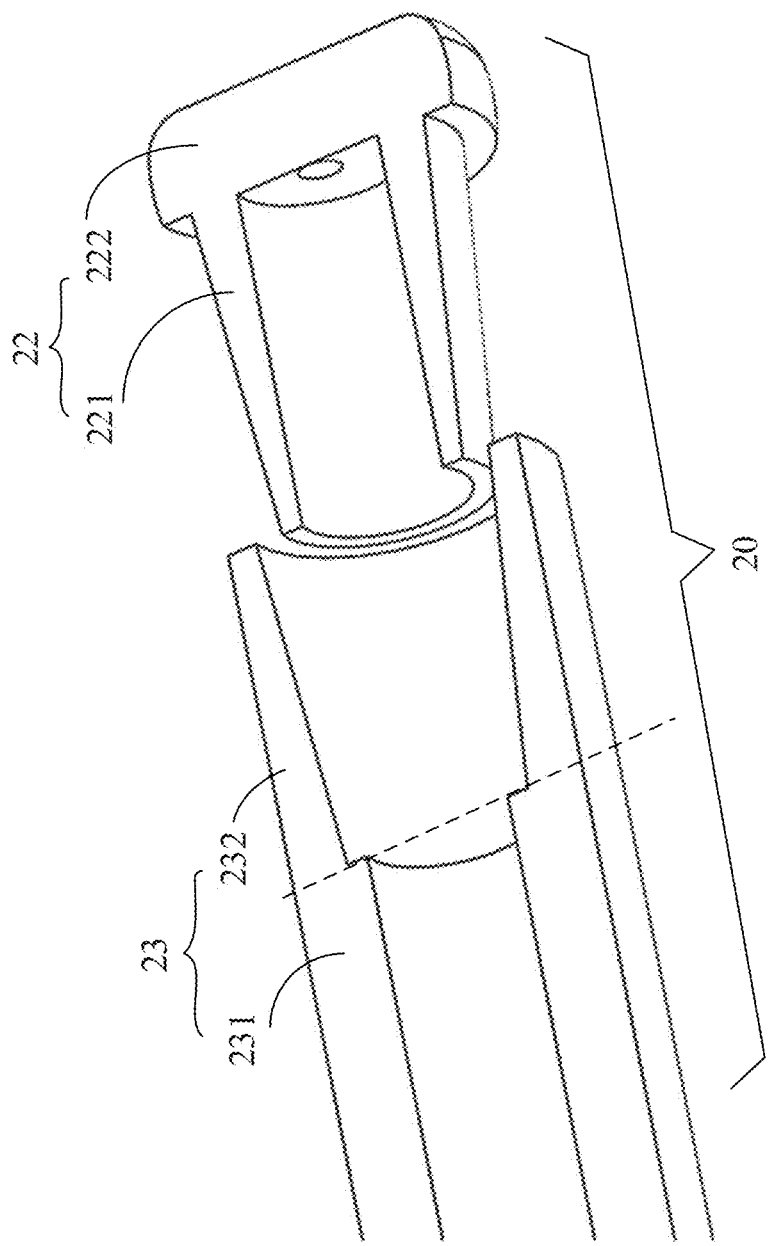
FIG. 3 is a partial perspective view illustrating the disassembly of a pipeline according to Example 2 of the disclosure.

FIG. 3 is a partial perspective view illustrating the disassembly of a pipeline in Example 2 of the disclosure. A pipeline 20, as shown in FIG. 3, comprises a sleeve 23 and a sealing member 22; the sealing member 22 comprises a first annular part 221; the pipeline 20 differs from the pipeline 10 as shown in FIG. 1 only in the shape of both the sleeve 23 and the first annular part 221.

Specifically, in certain embodiments, as shown in FIG. 3, the sleeve 23 comprises a first sleeve part 231 and a second sleeve part 232 disposed adjacent to the first sleeve part 231: the first sleeve part 231 is used to sleeve the pipeline body 11 (not shown), and the second sleeve part 232 is used to sleeve the first annular part 221; the sealing member 22 further comprises a second annular part 222; the first annular part 221 comprises a distal end and a proximal end; the distal end is away from the second annular part 222; and the proximal end is adjacent to the second annular part 222; the outer diameter of the first annular part 221 gradually decreases from the proximal end to the distal end; the inner diameter of the second sleeve part 232 also gradually decreases to match the decrease in the outer diameter of the first annular part 221; and the decrease is uniform or incremental. For example, the outer wall of the first annular part 221 is conical in the shape, and the inner wall of the second sleeve part 232 conforms the conical shape of the first annular part 221.

As a result of the decreased inner diameter, the second sleeve part 232 comprises an opening that gradually opens toward the sealing member 22, simplifying the placement and assembly of the first annular part 221. Sealing strength increases from the distal end to the proximal end. Thus, the first annular part 221 has a greater radial thickness at the proximal end compared to the distal end, leading to an enhanced sealing effectiveness.

Example 3

Figure 4:
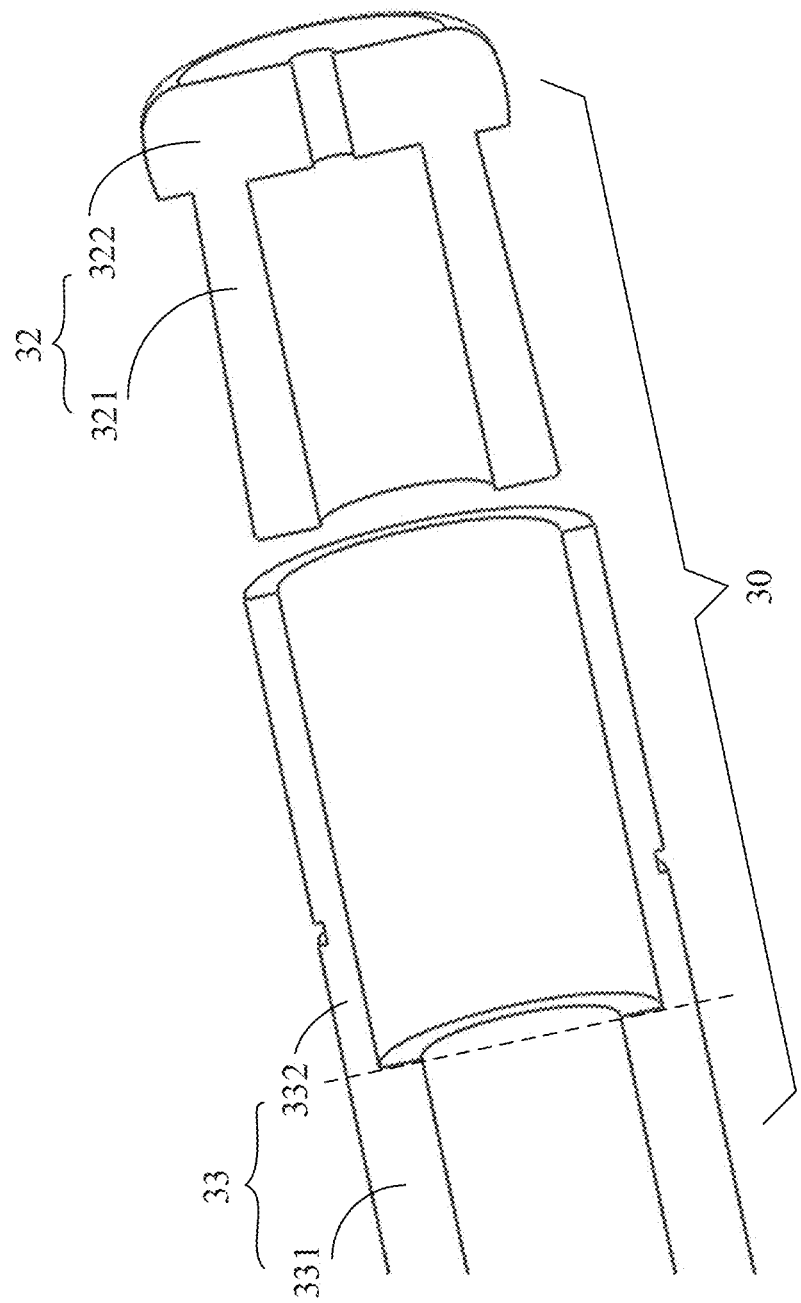
FIG. 4 is a partial perspective view illustrating the disassembly of a pipeline according to Example 3 of the disclosure.

FIG. 4 is a partial perspective view illustrating the disassembly of a pipeline in Example 3 of the disclosure. A pipeline 30, as shown in FIG. 4, comprises a sleeve 33 and a sealing member 32; the sealing member 32 comprises a first annular part 321. The pipeline 30 differs from the pipeline 20 shown in FIG. 3 only in the shape of both the sleeve 33 and the first annular part 321.

Specifically, in certain embodiments, as shown in FIG. 4, the sleeve 33 comprises a first sleeve part 331 and a second sleeve part 332 disposed adjacent to the first sleeve part 331: the first sleeve part 331 is used to sleeve the pipeline body 11 (not shown), and the second sleeve part 332 is used to sleeve the first annular part 321; the sealing member 32 further comprise a second annular part 322; the first annular part 321 comprises a distal end and a proximal end; the distal end is away from the second annular part 322, and the proximal end is adjacent to the second annular part 322; the outer diameter of the first annular part 321 gradually increases from the proximal end to the distal end. For example, the outer wall of the first annular part 321 is conical in the shape, and the inner wall of the second sleeve part 332 is cylindrical.

In certain embodiments, a sliding fit is formed between the first annular part 321 and the second sleeve part 332. For example, the first annular part 321 comprises a first segment and a second segment connected to the first segment; the first segment maintains a constant outer diameter, and the second segment has a decreased outer diameter from the distal end to the proximal end. The first segment is in tight engagement with the second sleeve part 322, and the second segment is in a sliding fit with the second sleeve part 322. The design forms space in the sliding fit region to absorb deformation caused by the compression of the sealing member 33, reducing excessive stress on the sealing member 33 and improving overall reliability.

Example 4

Figure 5:
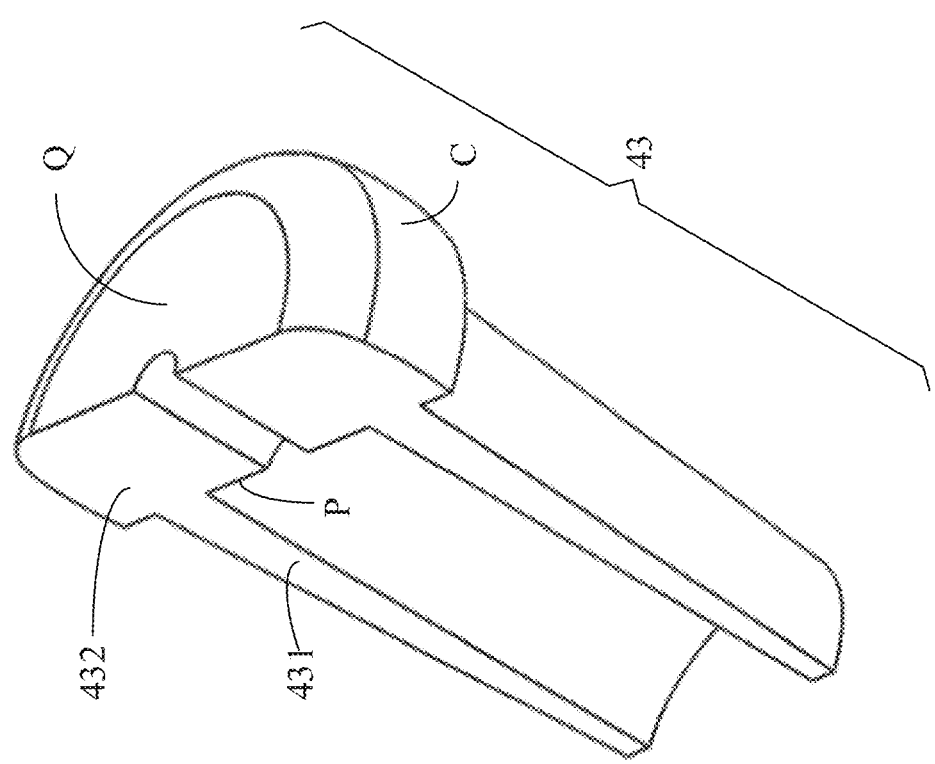
FIG. 5 is a perspective view of a sealing member according to one example of the disclosure.

FIG. 5 is a perspective view of a sealing member in one example of the disclosure. As shown in FIG. 5, a sealing member 43 comprises a first annular part 431 and a second annular part 432; the first annular part 431 and the second annular part 432 are disposed coaxially. Specifically, the second annular part 432 comprises a distal end and a proximal end; the distal end is away from the first annular part 431, and the proximal end is adjacent to the first annular part 431; the outer diameter of the second annular part 432 increases and then decreases from the distal end to the proximal end, so that a ring-shaped protrusion is formed on the outer wall of the second annular part 432. The ring-shaped protrusion ensures effective sealing while also providing space to absorb deformation caused by the compression of the second annular part 432 during sealing connections. The design enhances axial sealing effectiveness, reduces deformation stress within the sealing member 432, and improves reliability.

In certain embodiments, the second annular part 432 further comprises a first surface P, a second surface Q, and a side surface C; the first surface P is oriented toward the first annular part 431; the second surface Q is opposite to the first surface P; the side surface C connects the first surface P and the second surface Q; and a smooth transition is formed between the second surface Q and the side surface C. For example, a chamfer is formed at a junction of the second surface Q and the side surface C. The design simplifies the process of guiding the pipeline 10 into the target component, while also facilitating the radial deformation of the second annular part 432.

Figure 6:
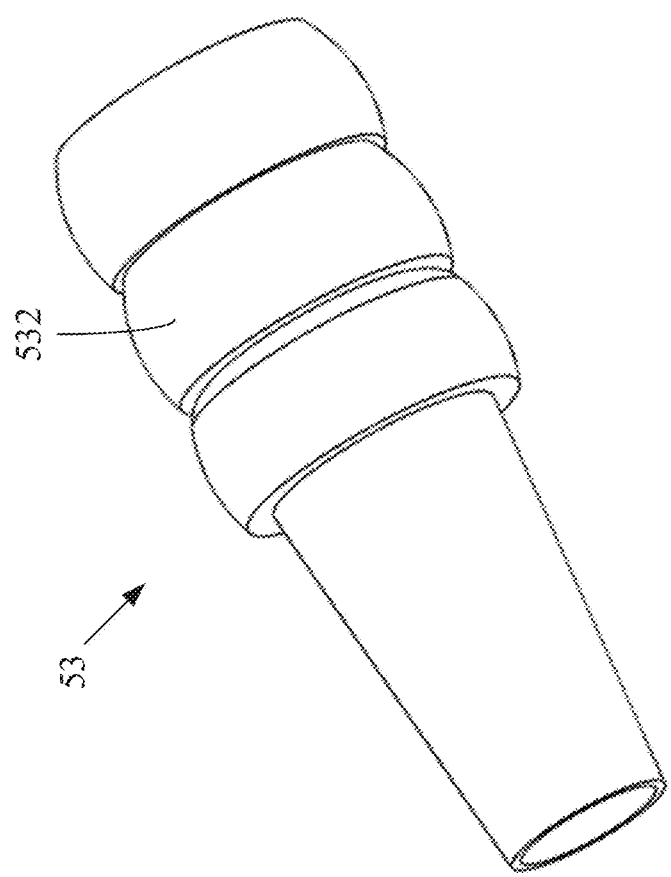
FIG. 6 is a perspective view of a sealing member according to Example 2 of the disclosure.

FIG. 6 is a perspective view of a sealing member in Example 2 of the disclosure. A sealing member 53, as shown in FIG. 6, comprises a second annular part 532. The sealing member 53 differs from the sealing member 43 shown in FIG. 5 only in the shape of the outer wall of the second annular part 532. Specifically, the second annular part 532 comprises a plurality of the ring-shaped protrusions sequentially arranged, resembling a string of beads or a cylindrical candy. The plurality of ring-shaped protrusions enhances lateral seals.

Figure 7:
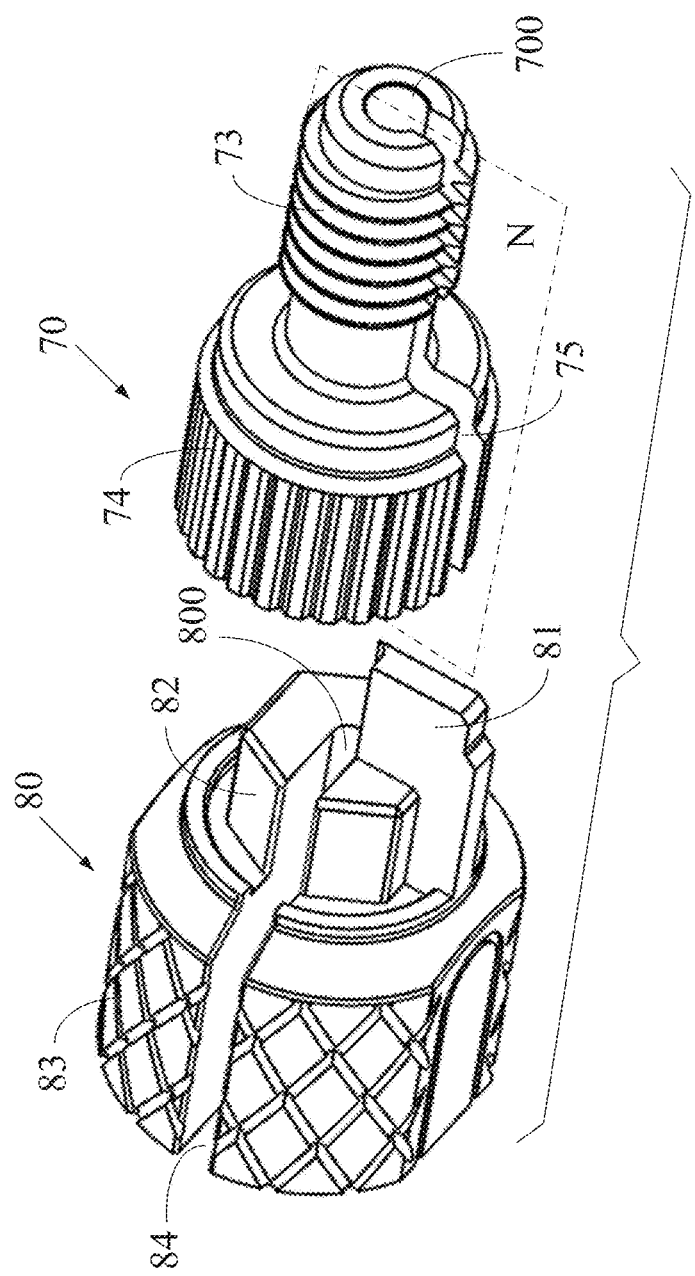
FIG. 7 is a perspective view of a pipeline connector according to one example of the disclosure.

The disclosure further provides a pipeline connector used to connect the pipeline of any one of the disclosure to the target component. FIG. 7 is a perspective view of a pipeline connector according to one example of the disclosure. As shown in FIG. 7, the pipeline connector comprises a screw 70 and a cap 80 detachably connected to the screw 70. The screw 70 can function as a pipeline connector without needing the cap 80 for operation. Further details regarding the structure and function of the screw 70 and the cap 80 are described below in conjunction with the accompanying drawings.

Figure 8:
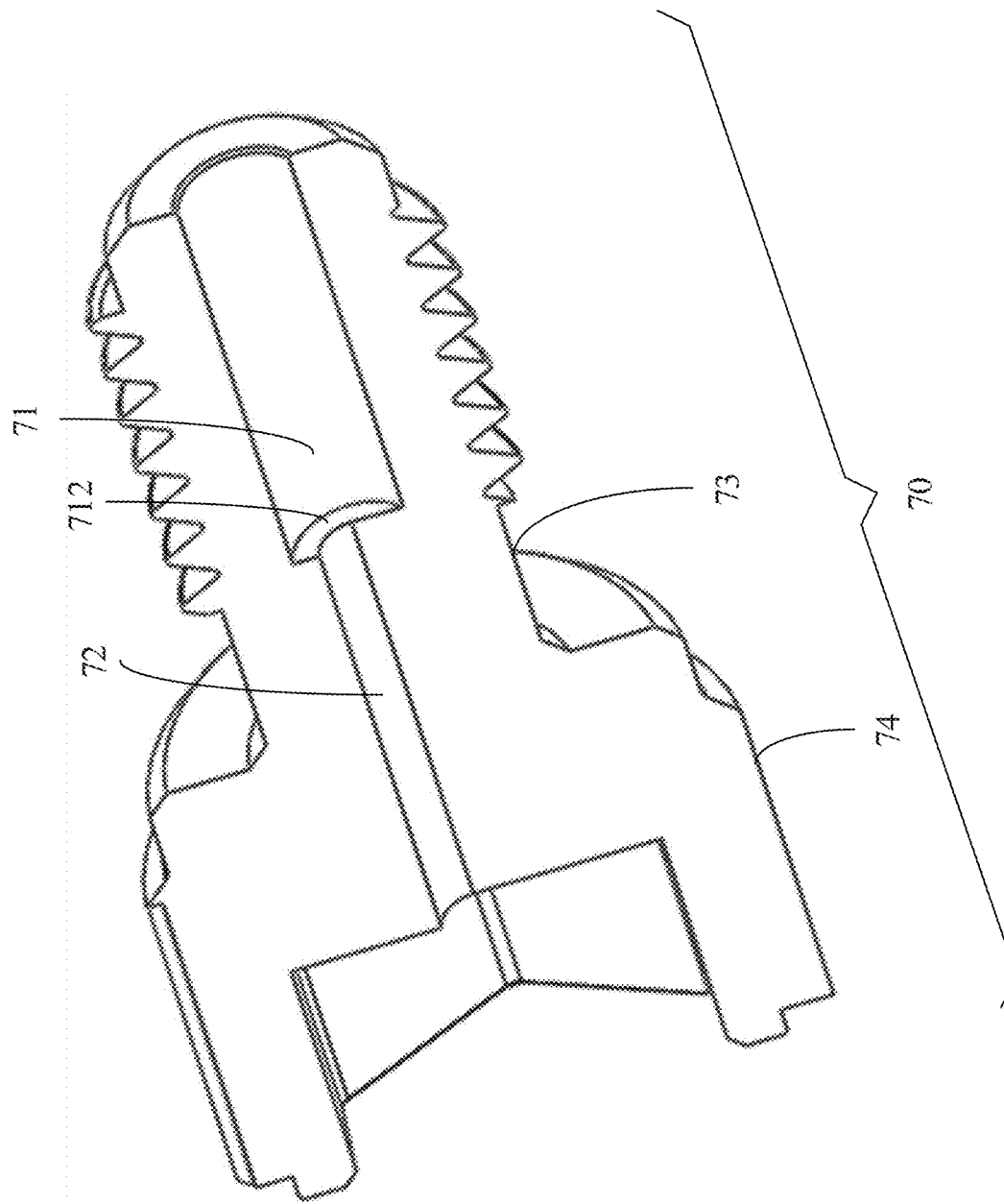
FIG. 8 is a cross sectional view of a screw according to Example 1 of the disclosure.
Figure 9:
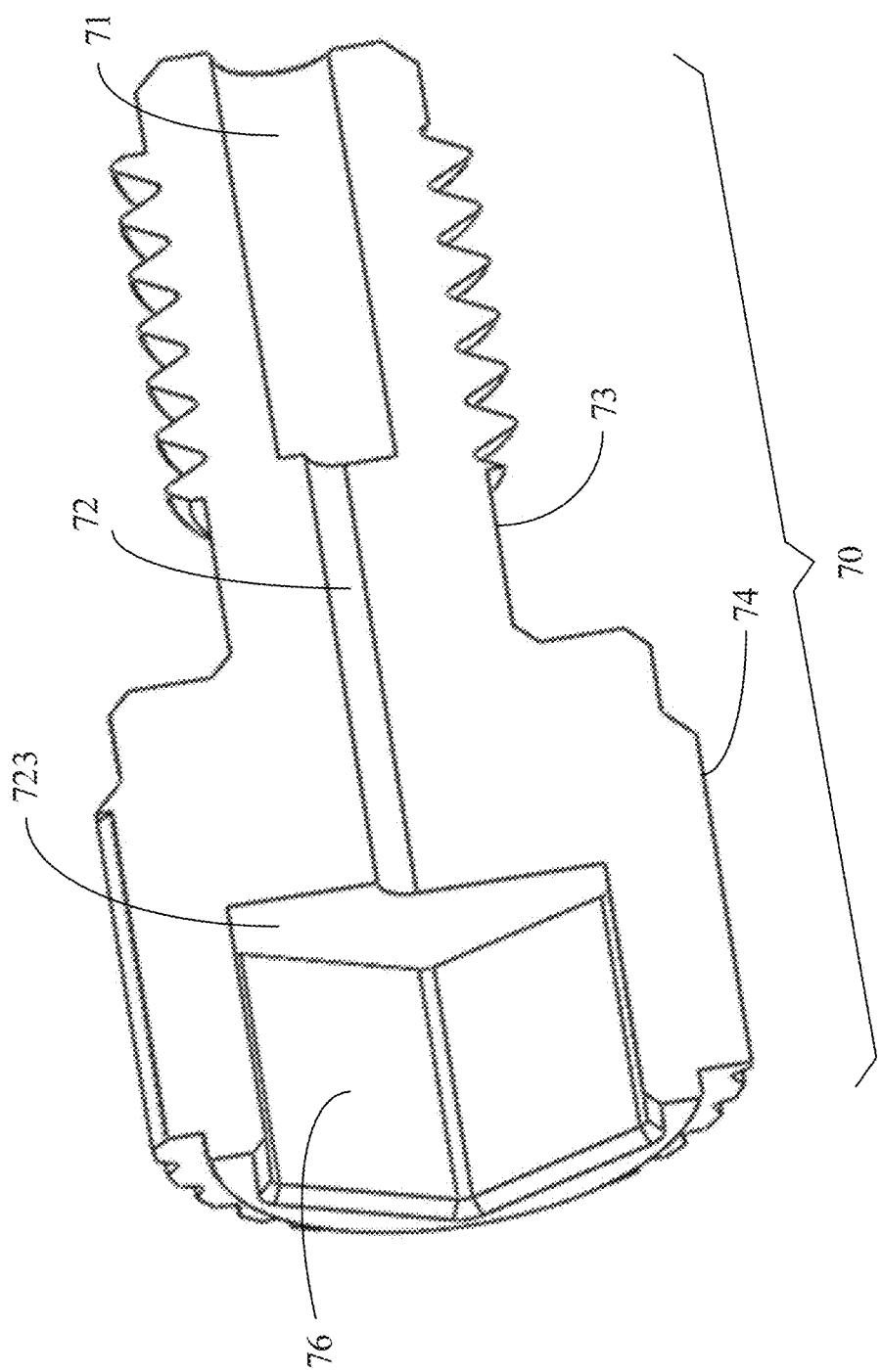
FIG. 9 is a cross sectional view of a screw according to Example 2 of the disclosure.

FIG. 8 is a cross sectional view of a screw according to Example 1 of the disclosure. FIG. 9 is a cross sectional view of a screw according to Example 2 of the disclosure. FIGS. 8 and 9 illustrate the cross-sectional configurations of the screw at a plane N, from varying perspectives, as shown in FIG. 7. Referring to FIGS. 7 and 8, the screw 70 comprises a first through hole 700; the first through hole 700 comprises a first hole part 71 and a second hole part 72 disposed adjacent to the first hole part 71; the first hole part 71 has a greater diameter than the second hole part 72; and a junction of the first hole part 71 and the second hole part 72 forms a first step structure 712.

Specifically, the screw 70 is in the shape of a tube; the first hole part 71 has a greater diameter than the second hole part 72; the first hole part 71 and the second hole part 72 are joined by an annular plane oriented perpendicular to the axial direction, thereby forming the first step structure 712.

The target component comprises a liquid channel entrance comprising internal threads. The screw 70 is used to connect the pipeline of any one of the disclosure and the target component. The sleeve 13 comprises a distal end away from the sealing member 12. Specifically, the pipeline comprises a non-connecting end and a connecting end; the connecting end is disposed opposite the non-connecting end. When in use, the non-connecting end is inserted from one side of the screw 70, and the screw 70 is then threaded into the internal threads of the liquid channel entrance; as the depth of threading increases, the distal end of the sleeve 13 gradually contacts the first step structure 712; and a sealed connection is formed between the pipeline 10 and the liquid channel entrance, thereby minimizing the dead volume.

In certain embodiments, as shown in FIGS. 7 and 8, the outer wall of the screw 70 comprises a first wall section 73 and a second wall section 74; the first wall section 73 has a smaller diameter than the second wall section 74; the first wall section 73 comprises external threads, and the second wall section 74 comprises a knurling pattern. The second wall section 74 functions as a load-bearing segment, and the first wall section 73 functions as a threaded segment, simplifying the assembly process. Understandably, other rough structures, such as a pattern of protrusions, can also be disposed on the second wall section 74, not limited to the knurling pattern.

In certain embodiments, a plane where the first step structure 712 is located intersects with the external threads on the first wall section 73. The first step structure 712 serves as a stop for the pipeline 10 and thus experiences heightened stress. When the plane intersects with the external threads, the first step structure is disposed in a threaded area between the screw 70 and the liquid channel entrance, ensuring that the liquid channel entrance protects the first step structure and improves the reliability of the screw 70.

In certain embodiments, as shown in FIGS. 7 and 8, the sidewall of the screw 70 further comprises a first slot 75 communicating with the first through hole 700. The first slot 75 extends axially through the sidewall of the screw 70. A width of the first slot 75, measured in the direction perpendicular to the axis of the first through hole 700, is smaller than the diameter of the first hole part 71 but equal to or larger than the diameter of the second hole part 72. The pipeline 10 is inserted radially through the first slot 75 into the first through hole 700. The design simplifies and enhances the efficiency of the assembly process compared to inserting the pipeline 10 from the one side of the screw 70.

When in use, as shown in FIGS. 7, 8, and 9, the pipeline 10 may pop out from the first slot 75 or bend within the first slot 75. To address the problems, the cap 80 is used in conjunction with the screw 70. As shown in FIG. 7, the cap 80 is detachably connected to the screw 70; the cap 80 comprises a second through hole 800 and a protrusion 81; the protrusion 81 extends axially along the second through hole 800. The second through hole 800 and the first through hole 700 are coaxially disposed. The protrusion 81 is at least partially inserted into the first slot 75. The protrusion 81 serves as a limiter for the pipeline within the first through hole 700. In certain embodiments, the protrusion 81 is at least partially inserted into the first slot 75 and engages with the first slot 75; therefore, the protrusion 81 is further used to secure the cap 80 to the screw 70.

In certain embodiments, as shown in FIGS. 7 and 9, the first through hole 700 further comprises a third hole part 76; one end of the second hole part 72 is away from the first hole part 71; and the third hole part 76 is disposed at the end of the second hole part 72. The third hole part 76 has a greater radial cross-sectional area than the second hole part 72. A junction of the third hole part and the second hole part forms a second step structure. Specifically, the third hole part 76 and the second hole part 72 are joined by an annular plane oriented perpendicular to the axial direction, thereby forming the second step structure 723.

The outer wall of the cap 80 comprises a first cap section 82. The outer diameter of the first cap section 82 matches the inner diameter of the third hole part 76, so that the first cap section 82 is connected to the third hole part 76 by an interlocking fit. The cap 80 further comprises an end face abutting against the second step structure 723. For example, the first cap section 82 is connected to the end face of the cap 80; and the end face of the cap 80 abuts against the second step structure 723. The protrusion 81 is disposed on the end face of the cap 80 and is at least partially inserted into the first slot 75. The protrusion 81 comprises a curved surface oriented toward the second through hole 800; the second through hole 800 is encircled by a sidewall, and the curved surface forms a seamless connection with the sidewall of the second through hole 800. In certain embodiments, the protrusion 81 facing the second through hole 800 is flat, as an alternative to the curved surface. The curved surface matches the shape of the outer wall of the pipeline body 11, avoiding sharp edges that compress the pipeline body 11 and thereby improving reliability. The first cap section 82 has a polygonal cross-sectional shape in the direction perpendicular to the axis of the second through hole 800; and a projection of the inner wall of the third hole part 76 along the axial direction of the first through hole 700 is polygonal, allowing the insertion of the first cap section 82 into the third hole part 76.

The cap 80 is connected to the screw 70 by an interlocking fit, and the protrusion 81 is at least partially inserted into the first slot 75 to secure the cap 80 to the screw 70. The design is simple in structure and facilitates installation.

In certain embodiments, as shown in FIG. 7, the outer wall of the cap 80 further comprises a second cap section 83 connected to the first cap section 82. Specifically, the first cap section 82 comprises a distal end away from the screw 70; and the second cap section 83 is connected to the distal end of the first cap section 82. The second cap section 83 has a greater radial cross-sectional area than the second wall section 74. The design enables the second cap section 83 to take on the load-bearing role, effectively replacing the second wall section 74. The shift results in increased torque and reduces the external force required for assembly. Given the detachably of the cap 80 from the screw 70, the screw 70 can function as a pipeline connector, independent of the cap 80. When two pipeline connectors are closed disposed, causing interference between two caps 80, removing the cap 80 after the tightening operation allows the screw 70 to operate as an independent pipeline connector, thereby accommodating the spacing between the two adjacent pipeline connectors. Consequently, the connector of the disclosure is suitable for a broader range of applications.

In certain embodiments, the second cap section 83 comprises has a textured surface, such as a knurling pattern, a diamond-shaped pattern, and a pattern of spaced strip-like protrusions. In certain embodiments, the second cap section 83 comprises two parallel planes.

In certain embodiments, as shown in FIG. 7, the sidewall of the cap 80 comprises a second slot 84 communicating with the second through hole 800. The second slot 84 extends axially through the sidewall of the cap 80. The pipeline is inserted radially through the second slot 84 into the second through hole 800, simplifying the process of assembly and disassembly. In certain embodiments, a width of the second slot 84, measured in the direction perpendicular to the axis of the second through hole 800, is equal to the width of the first slot 75 in the direction perpendicular to the axis of the first through hole 700. The second slot 84 and the protrusion 81 are disposed alternately in the circumferential direction.

Figure 10:
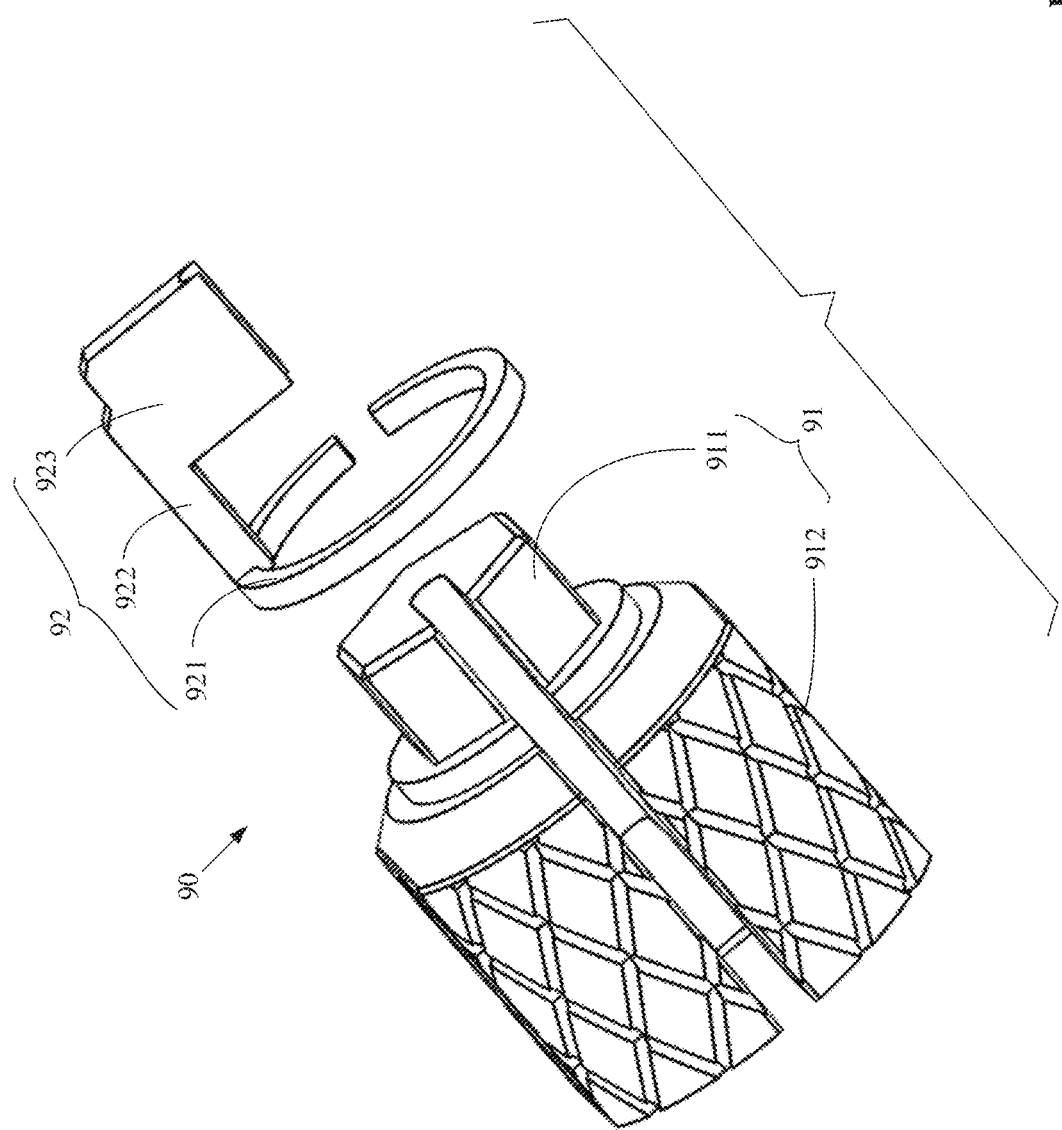
FIG. 10 is a perspective view of a cap according to one example of the disclosure.
Figure 11:
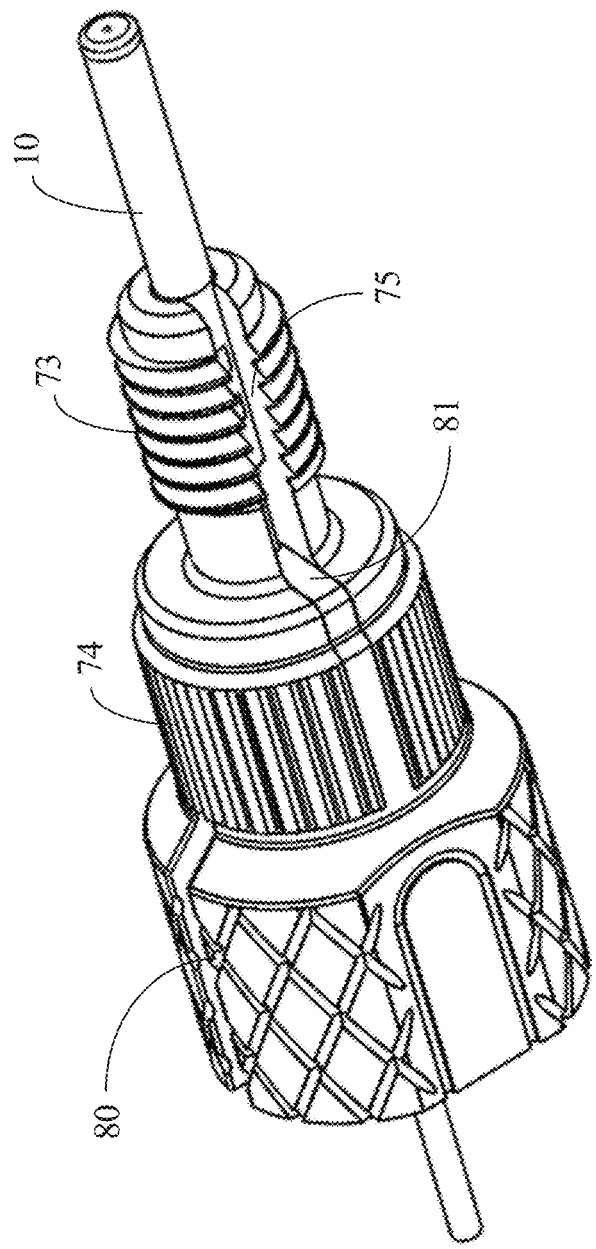
FIG. 11 is a perspective view illustrating the assembly of a pipeline connector and a pipeline according to one example of the disclosure.

FIG. 10 is a perspective view of a cap 90 in one example of the disclosure. The cap 90, as shown in FIG. 10, differs from the cap 80 as depicted in FIG. 7, as the protrusion 81 is an independent component, not integrated into the cap 80. Specifically, referring to FIGS. 7 and 10, the cap 90 comprises a base 91 and a limiting element 92 detachably connectable to the base 91. The outer wall of the base 91 comprises a first base part 911 and a second base part 912 disposed adjacently along the axial direction. The first base part 911 comprises a smaller radial cross-sectional area than the second base part 912. In certain embodiments, the radial cross-section of the first base part 911 is polygonal, and the radial cross-section of the second base part 912 is circular. The limiting element 92 comprises a collar 921, a connecting part 922, and a protruding part 923. The collar 921 is a closed ring or a ring with an opening. The collar 921 comprises a front surface perpendicular to the axis of the cap 90; the front surface is connected to one end of the connecting part 922; and the other end of the connecting part 922 is connected to the protruding part 923. The collar 921 is divided into a central area and an edge area surrounding the central area; and the pipeline body 11 is inserted through the central area. The projection of the protruding part 923 along the axial direction of the collar 921 falls within the edge area. The collar 921 sleeves the outer wall of the first base part 911, and the protruding part 923 is at least partially inserted into the first slot 75. FIG. 11 is a perspective view illustrating the assembly of a pipeline connector and a pipeline according to one example of the disclosure. As shown in FIGS. 2, 7, and 11, the cap 80 and the screw 70 are successively disposed on the pipeline 10; the distal end of the sleeve 13 abuts the first step structure 712; the protrusion 81 is at least partially inserted into the first slot 75 and is disposed within the second wall section 74; and the first cap segment 82 is connected to the third hole part 76 by an interlocking fit.

The disclosure further provides a liquid chromatography system. The liquid chromatography system comprises a pipeline connection part. The pipeline connection part comprises the pipeline of any one of the examples, the pipeline connector of any one of the examples, and the target component. The target component comprises the liquid channel entrance provided with the internal threads, and is a chromatographic column, a two-way valve, a three-way valve, an injection valve, a liquid pump, or a detection cell. When the pipeline connector comprises only the screw 70, the pipeline connector sleeves the outer wall of the pipeline; the distal end of the sleeve abuts against the first step structure 712; and the screw 70 is threaded into the internal threads of the liquid channel entrance.

In certain embodiments, the screw comprises a distal end away from the sealing member; the pipeline connector further comprises the cap 80; the cap 80 is disposed at the distal end of the screw 70 and sleeves the outer wall of the pipeline; and the protrusion 81 is at least partially inserted into the first slot 75.

It will be obvious to those skilled in the art that changes and modifications may be made, and therefore, the aim in the appended claims is to cover all such changes and modifications.

What is claimed is:
1. A pipeline, comprising:
   a pipeline body:
   a sealing member; and
   a sleeve;
wherein:
   the pipeline body comprises a connection end; the connection end comprises a first section and a second section adjacent to the first section; and the first section comprises an end face perpendicular to an axis of the pipeline body;
   the sealing member comprises a first annular part and a second annular part; the first annular part and the second annular part are disposed coaxially; the second annular part comprises a first surface oriented toward the first annular part; an axial projection of the first annular part falls within the first surface; the first surface comprises a first region and a second region; the first region is enclosed by the axial projection of the first annular part, and the second region surrounds the axial projection of the first annular part; the first annular part sleeves an outer wall of the first section; and the end face of the first section abuts against the first region;

the sleeve sleeves the second section and the first annular part; and the sleeve comprises an end face abutting against the second region; and an outer diameter of the second annular part increases and then decreases along the axial direction.

2. The pipeline of claim 1, wherein the sleeve is at least partially connected to the first annular part by a sliding fit.

3. The pipeline of claim 2, wherein the first annular part comprises a distal end and a proximal end; the distal end is away from the second annular part, and the proximal end is adjacent to the second annular part; an outer diameter of the first annular part gradually decreases from the proximal end to the distal end;

the sleeve comprises a section sleeving the first annular part; and an inner diameter of the section gradually decreases to match the decrease in the outer diameter of the first annular part.

4. The pipeline of claim 2, wherein the first annular part comprises a distal end and a proximal end; the distal end is away from the second annular part, and the proximal end is adjacent to the second annular part; an outer diameter of the first annular part gradually increases from the proximal end to the distal end;

the sleeve comprises a section sleeving the first annular part; and an inner wall of the section is cylindrical in the shape.

5. The pipeline of claim 1, wherein the first annular part comprises a distal end and a proximal end; the distal end is away from the second annular part, and the proximal end is adjacent to the second annular part;

an outer diameter of the first annular part gradually decreases from the proximal end to the distal end; the sleeve comprises a section sleeving the first annular part;

and an inner diameter of the section gradually decreases to match the decrease in the outer diameter of the first annular part.

6. The pipeline of claim 1, wherein the first annular part comprises a distal end and a proximal end; the distal end is away from the second annular part, and the proximal end is adjacent to the second annular part;

an outer diameter of the first annular part gradually increases from the proximal end to the distal end; the sleeve comprises a section sleeving the first annular part;

and an inner wall of the section is cylindrical in the shape.

7. The pipeline of claim 1, wherein an inner diameter of the second annular part is 1.05-1.65 times that of the pipeline body.

8. The pipeline of claim 1, wherein the second annular part further comprises a second surface and a side surface; the second surface is opposite to the first surface; the side surface connects the first surface and the second surface; and a smooth transition is formed between the second surface and the side surface.

9. The pipeline of claim 1, wherein the sleeve comprises a first sleeve part and a second sleeve part; the first sleeve part sleeves an outer wall of the second section; the second sleeve part sleeves an outer wall of the first annular part; the sleeve further comprises a first tightening section and/or a second tightening section; the first tightening section is disposed on the first sleeve part; and the second tightening section is disposed on the second sleeve part.

10. A liquid chromatography system, comprising:
the pipeline of claim 8;
a target component, comprising a liquid channel entrance comprising internal threads; and
a pipeline connector comprising a screw;
wherein:
the screw comprises a first through hole; the first through hole comprises a first hole part and a second hole part disposed adjacent to the first hole part; the first hole part has a greater diameter than the second hole part; and a junction of the first hole part and the second hole part forms a first step structure; and
the screw sleeves an outer wall of the pipeline; the sleeve comprises a distal end away from the sealing member; the distal end of the sleeve abuts against the first step structure; and the screw is threaded into the internal threads of the liquid channel entrance.

11. A pipeline, comprising:
a pipeline body;
a sealing member; and
a sleeve;
wherein:
the pipeline body comprises a connection end; the connection end comprises a first section and a second section adjacent to the first section; and the first section comprises an end face perpendicular to an axis of the pipeline body;
the sealing member comprises a first annular part and a second annular part; the first annular part and the second annular part are disposed coaxially; the second annular part comprises a first surface oriented toward the first annular part; an axial projection of the first annular part falls within the first surface; the first surface comprises a first region and a second region; the first region is enclosed by the axial projection of the first annular part, and the second region surrounds the axial projection of the first annular part; the first annular part sleeves an outer wall of the first section; and the end face of the first section abuts against the first region;
the sleeve sleeves the second section and the first annular part; and the sleeve comprises an end face abutting against the second region; and
an outer diameter of the second annular part repeats a pattern of increasing and then decreasing along the axial direction multiple times.

12. A pipeline connector, comprising a screw; wherein:
the screw comprises a first through hole; the first through hole comprises a first hole part and a second hole part disposed adjacent to the first hole part; the first hole part has a greater diameter than the second hole part; and a junction of the first hole part and the second hole part forms a first step structure;
a sidewall of the screw further comprises a first slot communicating with the first through hole; the first slot extends axially through the sidewall of the screw; a width of the first slot, measured in a direction perpendicular to an axis of the first through hole, is smaller than a diameter of the first hole part but equal to or larger than a diameter of the second hole part;
the pipeline connector further comprises a cap detachably connected to the screw; the cap comprises a second through hole and a protrusion; and the protrusion extends axially along the second through hole;
the second through hole and the first through hole are coaxially disposed;

and the protrusion is at least partially inserted into the first slot.

13. The pipeline connector of claim 12, wherein an outer wall of the screw comprises a first wall section and a second wall section;
the first wall section has a smaller diameter than the second wall section; and the first wall section comprises external threads.

14. The pipeline connector of claim 13, wherein a plane where the first step structure is located intersects with the external threads on the first wall section.

15. The pipeline connector of claim 12, wherein the first through hole further comprises a third hole part; one end of the second hole part is away from the first hole part; the third hole part is disposed at the end of the second hole part;
the third hole part has a greater radial cross-sectional area than the second hole part; and a junction of the third hole part and the second hole part forms a second step structure;
an outer wall of the cap comprises a first cap section; an outer diameter of the first cap section matches an inner diameter of the third hole part, so that the first cap section is connected to the third hole part by an interlocking fit.

16. The pipeline connector of claim 15, wherein the outer wall of the cap further comprises a second cap section connected to the first cap section; the first cap section comprises a distal end away from the screw; the second cap section is connected to the distal end of the first cap section; and the second cap section has a greater radial cross-sectional area than the second wall section.

17. The pipeline connector of claim 15, wherein a sidewall of the cap comprises a second slot communicating with the second through hole; the second slot extends axially through the sidewall of the cap; the second slot and the protrusion are disposed alternately in a circumferential direction.

* * * * *